US009763081B2

(12) United States Patent
Ziat et al.

(10) Patent No.: US 9,763,081 B2
(45) Date of Patent: Sep. 12, 2017

(54) SYSTEM AND METHOD FOR POLICY CONTROL FUNCTIONS MANAGEMENT MECHANISM

(71) Applicant: APPLE INC., Cupertino, CA (US)

(72) Inventors: Mehdi Ziat, San Francisco, CA (US); Christopher Sharp, San Jose, CA (US); Kevin P. McLaughlin, Mountain View, CA (US); Li Li, Los Altos, CA (US); Jerrold V. Hauck, Windermere, FL (US); Yousuf H. Vaid, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 237 days.

(21) Appl. No.: 14/549,088

(22) Filed: Nov. 20, 2014

(65) Prior Publication Data

US 2015/0172912 A1 Jun. 18, 2015

Related U.S. Application Data

(60) Provisional application No. 61/907,047, filed on Nov. 21, 2013.

(51) Int. Cl.
*H04W 4/00* (2009.01)
*H04W 8/22* (2009.01)
*G06F 9/445* (2006.01)
*G06F 9/50* (2006.01)

(52) U.S. Cl.
CPC .......... *H04W 8/22* (2013.01); *G06F 9/44505* (2013.01); *G06F 9/5011* (2013.01)

(58) Field of Classification Search
CPC ..... H04W 8/22; G06F 9/5011; G06F 9/44505
See application file for complete search history.

(56) References Cited

U.S. PATENT DOCUMENTS

| 6,401,206 | B1 * | 6/2002 | Khan | H04L 9/3231 713/176 |
|---|---|---|---|---|
| 8,903,974 | B2 * | 12/2014 | Rajagopalan | 709/223 |
| 2001/0002485 | A1 * | 5/2001 | Bisbee | G06Q 20/00 713/167 |

(Continued)

FOREIGN PATENT DOCUMENTS

| CN | 102835071 | 12/2012 |
| WO | 2006/085281 | 8/2006 |

*Primary Examiner* — Clemence Han
(74) *Attorney, Agent, or Firm* — Fay Kaplan & Marcin, LLP

(57) ABSTRACT

Systems and methods for validating and applying modifications to a policy control function (PCF) of a station. The methods include generating a PCF package including a modification to a PCF, and determining whether the PCF package is to be transmitted to the station by a first or second entity. The methods further include when the PCF package is to be transmitted by the first entity, including a first signature of the first entity in a deliverer field of the PCF package, and when the PCF package is to be transmitted by the second entity, including the first signature in an owner field and a second signature of the second entity in the deliverer field. The methods further include receiving the PCF package from the first or second entity, determining whether the PCF package is valid, and applying the modification to the PCF when it is determined the PCF package is valid.

19 Claims, 6 Drawing Sheets

PCF Package
200

Header 210
  Owner's Signature 220: /Owner 1/
  Deliverer's Signature 230: /Deliverer 2/
Body Modification 240
  PCF Modification

(56) References Cited

U.S. PATENT DOCUMENTS

| | | | |
|---|---|---|---|
| 2002/0184535 A1* | 12/2002 | Moaven | G06F 21/6218 726/17 |
| 2003/0131245 A1* | 7/2003 | Linderman | H04L 63/0218 713/176 |
| 2006/0277409 A1* | 12/2006 | Galwas | G06F 21/6209 713/176 |
| 2010/0011410 A1 | 1/2010 | Liu | |
| 2010/0211792 A1* | 8/2010 | Ureche | H04L 9/3247 713/176 |
| 2010/0241617 A1* | 9/2010 | Murphy | G06F 21/6218 707/665 |
| 2011/0145902 A1 | 6/2011 | Kim et al. | |
| 2012/0079559 A1* | 3/2012 | Reznik | H04L 12/5692 726/1 |
| 2012/0144210 A1* | 6/2012 | Yacobi | H04L 9/0836 713/193 |

* cited by examiner

PCF Package
200

Header 210
    Owner's Signature 220: /Owner 1/

Deliverer's Signature 230: /Deliverer 2/

Body Modification 240

PCF Modification

PCF Database
600

| PCF Type | Valid Owner | Valid Deliverer |
|---|---|---|
| A | First Owner 105 | First Deliverer 115 |
| B | Second Owner 110 | Second Deliverer 120 |
| C | First Owner 105 Second Owner 110 | Second Deliverer 120 |

SYSTEM AND METHOD FOR POLICY CONTROL FUNCTIONS MANAGEMENT MECHANISM

PRIORITY CLAIM/INCORPORATION BY REFERENCE

This application claims priority to U.S. Provisional Application 61/907,047 entitled "System and Method for Policy Control Functions Management Mechanism," filed on Nov. 21, 2013, the entirety of which is incorporated herein by reference.

BACKGROUND INFORMATION

A station may include various policy control functions that dictate settings in which the station is allowed to operate on the platform level. For example, a policy control function may be a setting for a maximum number of applications that may be stored. The policy control functions may initially be preloaded and may also be subsequently modified. For example, a further policy control function may be added, an existing policy control function may be altered, or an existing policy control function may be deleted. Because of the security level of the policy control functions, only authorized entities are given access to modify them.

SUMMARY

A first exemplary embodiment includes a method performed by a network component associated with a first entity. The method includes generating a policy control function (PCF) package including a modification to a PCF associated with a station, and determining whether the PCF package is to be transmitted to the station by one of the first entity and a second entity. The method further includes when the PCF package is determined to be transmitted by the first entity, including a first signature indicative of the first entity in a deliverer field of the PCF package and when the PCF package is determined to be transmitted by the second entity, including the first signature in an owner field of the PCF package.

A further exemplary embodiment includes a method performed by a station. The method includes receiving a policy control function (PCF) package from one of a first entity and a second entity, the PCF package including a modification to a PCF associated with the station, determining whether the PCF package is valid based on one of a first signature of the first entity in the PCF package or a second signature of the second entity in the PCF package, applying the modification to the PCF when it is determined the PCF package is valid and discarding the PCF package when it is determined the PCF package is invalid.

Another exemplary embodiment includes a station having a processor and a non-transitory computer readable storage medium including a set of instructions executable by the processor. Executing the set of instructions causes the processor to perform operations including receiving a policy control function (PCF) package from one of a first entity and a second entity, the PCF package including a modification to a PCF associated with the station, the first entity permitted to modify the PCF and one of transmit the PCF package to the second entity and transmit the PCF package to the station, the second entity permitted to transmit the PCF package to the station, determining whether one of (1) a deliverer field of the PCF package includes a first signature indicative of the first entity or (2) an owner field of the PCF package includes the first signature and the deliverer field includes a second signature indicative of the second entity and applying the modification to the PCF when one of (1) the PCF package is received from the first entity and the first signature in the deliverer field is one of at least one valid first signature or (2) the PCF package is received from the second entity, the first signature in the owner field is one of the at least one valid first signature, and the second signature in the deliverer field is one of at least one valid second signature.

DETAILED DESCRIPTION

Figure 1:
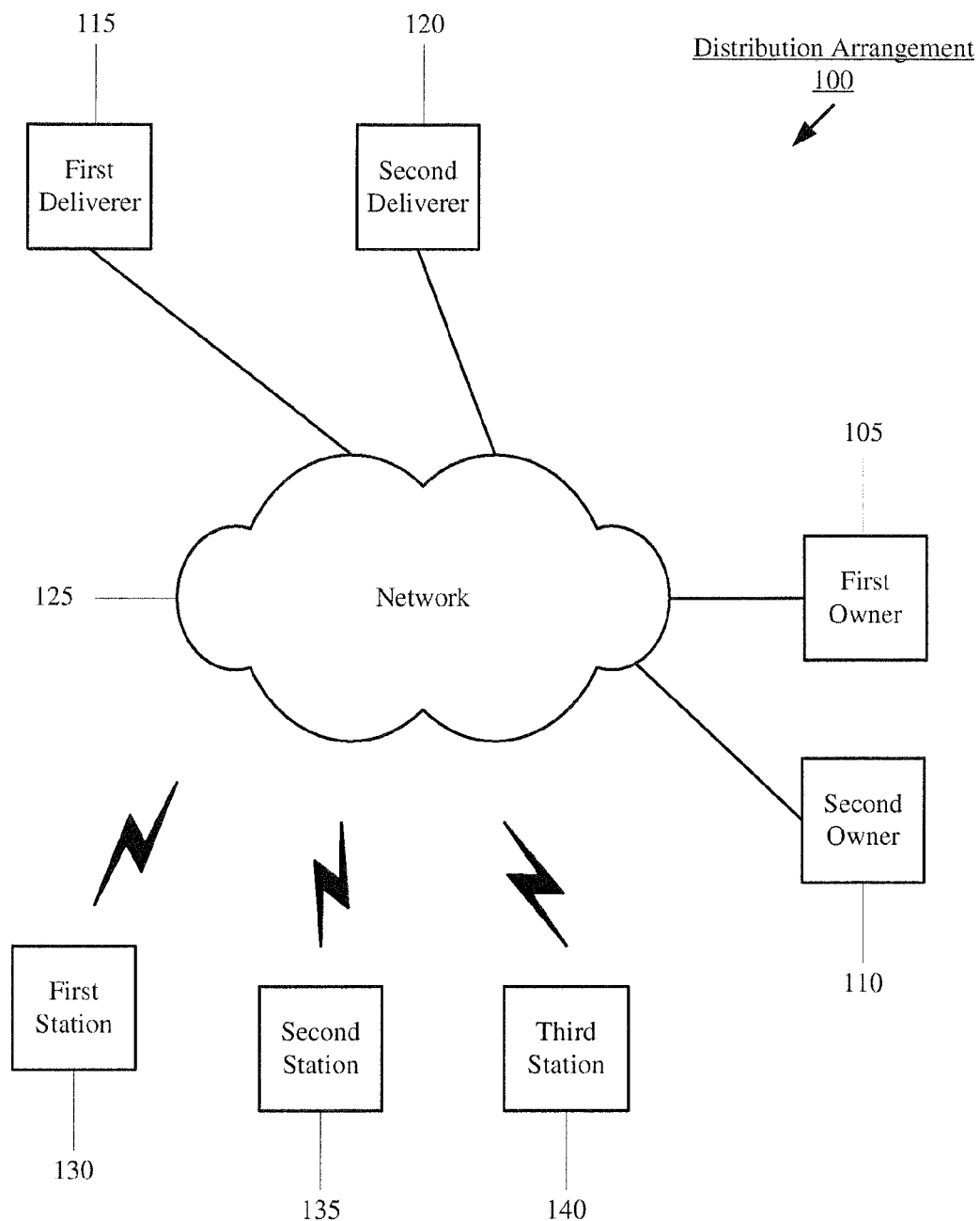
FIG. 1 shows an exemplary distribution arrangement configured to generate and provide a PCF package.

The exemplary embodiments may be further understood with reference to the following description and the related appended drawings, wherein like elements are provided with the same reference numerals. The exemplary embodiments are related to a system and method for policy control functions (PCF) management mechanisms. Specifically, the exemplary system and method provide a set of rules to manage and update PCFs on a secure element such as a Universal Integrated Circuit Card (UICC) or an embedded secure element. The rules in the exemplary systems and methods utilize a signature from an owner of the PCF, a signature from a deliverer of the PCF, or both. The signatures verify whether a delivered PCF to a station is valid to be applied. The PCFs, the rules, the secure element or the UICC, the verification, and related methods will be described in further detail below.

Prior to a station being deployed, the station may be preconfigured. For example, the station may have predetermined applications including an operating system that is installed prior to deployment. In another example, the station may have PCFs that are used to enforce rules and behaviors at the platform level (e.g., the operating system). The PCFs may dictate a manner in which the operating system is configured to operate. A PCF may indicate whether behaviors are allowed or disallowed. For example, the PCF may be a setting that indicates a maximum number of applications that may be stored on a UICC or embedded secure element of the station.

Because the PCFs relate to a fundamental manner in which the operating system is allowed to operate, the PCFs may only be modified by validated entities. One such entity may be an owner that represents an entity allowed to set a PCF. The owner may be an administrative entity that regulates the manner in which the PCFs are set. The owner may initially preload predetermined PCFs onto the station prior to deployment. After deployment, the PCFs may be modified by the owner. In order for the stations to apply the modified PCFs, the station receives the PCF either from the owner or another entity that is delegated the responsibility of providing the PCF to deployed stations such as a deliverer.

Even after the PCF is received by a deployed station, the validity of the PCF must be verified by determining whether the PCF has been modified by a valid owner and/or has been delivered by a valid deliverer. Accordingly, the station may also be preloaded with a PCF that is a database of valid owners and valid deliverers for respective types of PCFs. A PCF may be of a particular type in which only a subset of owners is set as valid owners that are allowed to modify the settings dictated by the PCF. The PCF may also be of the particular type in which only a subset of deliverers is set as valid deliverers that are allowed to transmit the PCF to deployed stations. Using this database, the deployed station may determine whether the PCF has been modified by a valid owner and/or received from a valid deliverer. Specifically, according to the exemplary system and method, a signature of the owner and/or a signature of the deliverer may be used as the basis of determining validity.

FIG. 1 shows an exemplary distribution arrangement 100 configured to generate and provide a PCF package. The exemplary PCF package may include the modification to a PCF as well as verification information (e.g., signature(s)). The distribution arrangement 100 may represent any network arrangement for a valid owner to modify a PCF, for the valid owner to generate a PCF package including the owner's signature, for the valid owner to transmit the PCF package to deployed stations or provide the PCF package to a deliverer for transmission to the deployed stations including the deliverer's signature, and for the deployed stations to receive the PCF package for further processing. The distribution arrangement 100 may include a first owner 105, a second owner 110, a first deliverer 115, a second deliverer 120, a network 125, a first station 130, a second station 135, and a third station 140.

As discussed above, the first owner 105 and the second owner 110 may be entities that are allowed to modify PCFs. For exemplary purposes, only two owners are shown in FIG. 1. However, those skilled in the art will understand that any number of owners may be included in the distribution arrangement 100. The first owner 105 and the second owner 110 may each be designated respective types of PCFs to manage. For example, when there are five different types of PCFs to manage, the first owner 105 may only be designated a first subset and the second owner 110 may also only be designated a second subset. However, it should be noted that any owner may be allowed to modify the entire set of PCFs. The first and second subsets may be exclusive to one another or may overlap. For example, when the subsets are exclusive, the first owner 105 may be allowed to modify three of the PCFs while the second owner 110 may be allowed to modify the remaining two of the PCFs. In another example, when the subsets are overlapping, the first owner 105 may be allowed to modify four of the PCFs while the second owner 110 may be allowed to modify the three of the PCFs including the remaining one of the PCFs such that two of the PCFs may be modified by both the first owner 105 and the second owner 110.

It should be noted that the network 125 illustrated in FIG. 1 may represent any network or series of networks to which the other components (e.g., stations 130, 135, 140, owners 105, 110 and deliverers 115 and 120) may connect. For example, the stations 130, 135 and 140 may be smartphones that connect to a cellular network (e.g., a Long Term Evolution (LTE) network) provided by a cellular provider (e.g., Verizon, AT&T, Sprint, T-Mobile, etc.). The cellular network may comprise many components such as base stations (e.g., evolved Node B's), gateways, cellular core network, etc. The cellular network may also allow the stations 130, 135 and 140 to connect to other networks such as the public Internet, cellular networks of other providers, etc. Thus, the stations 130, 135 and 140 may connect to other devices that are within the cellular network or any of the other networks to which the cellular network allows the stations 130, 135, 140 to connect. Similarly, the owners and deliverers may also connect to any of these networks. Therefore, the owners and deliverers may be understood to include any components that are necessary to perform the functions described herein. For example, the owners and deliverers may include network components such as servers, databases, communication arrangements, switches, etc. Thus, the network 125 should be understood to include any manner that allows the components to connect.

Figure 2:
FIG. 2 shows an exemplary PCF package according to the exemplary embodiments.

FIG. 2 shows an exemplary PCF package 200. The exemplary PCF package 200 includes a header 210 and a body 240. The header 210 may include an Owner Signature 220 and a Deliverer Signature 230. The header 210 may also include additional information such as destination, source, information on the PCF (e.g., PCF version, modification history, etc.). In this example, the Owner Signature 220 has been populated with the signature of "Owner 1" and the Deliverer Signature 230 has been populated with the signature of "Deliverer 2." This example will be carried through one or more of the examples described below. The body 240 may include the modification to be applied to the PCF. It should be noted that the PCF package 200 is only exemplary and there may be other manners of supplying the PCF modification to the deployed stations (e.g., in the form of files to be retrieved from an FTP server, as a self-contained executable file, as a URL link, etc.). It should also be noted that the PCF modification may be a change to an existing PCF, a new PCF, an instruction to delete an existing PCF or any change, addition, deletion to the deployed PCFs.

When either the first owner 105 or the second owner 110 modify a PCF, the first owner 105 or the second owner 110 may include an owner signature in the Owner Signature field 220 of the PCF package 200. The owner signature may be applied over the data comprising the PCF package 200. The Owner Signature field 220 and the Deliverer field 230 are used to set or update the owner and/or deliverer of a PCF when included in the PCF package 200 prior to distribution. In addition to the owner signature, the deliverer signature may be required in the PCF package 200 prior to its distribution. The deliverer signature may be applied over the data comprising the PCF package 200 including the optional owner signature. Thus, when the first owner 105 or the second owner 110 also distributes the PCF package 200 to the stations 130, 135, 140, the owner signature may be included in the Deliverer Signature field 230. In such a scenario, the owner signature may be ignored, meaning that it may not be attached to the PCF package 200. However, it should be noted that the owner signature may also be present and populated in both the Owner Signature field 220 and the Deliverer Signature field 230 when the owner distributes the PCF package 200.

As discussed above, the first deliverer 115 and the second deliverer 120 may be entities that receive the PCF package 200 from an owner (e.g., the first owner 105 and the second owner 110). In such a scenario, the first owner 105 and the second owner 110 may include the owner signature computed over the PCF package 200 and append it to the PCF package 200 (e.g., in the Owner Signature field 220) prior to transmitting the PCF package 200 to the first deliverer 115 or the second deliverer 120. The first deliverer 115 and the second deliverer 120 may also be allowed to distribute the PCF package 200 to the stations (e.g., the first station 130, the second station 135, and the third station 140). That is, the first deliverer 115 and the second deliverer 120 may be delegated entities that are allowed to perform this delivery functionality. For exemplary purposes, only two deliverers are shown in FIG. 1. However, those skilled in the art will understand that any number of deliverers may be included in the distribution arrangement 100. The first deliverer 115 and the second deliverer 120 may also be designated respective types of PCFs to transmit in a substantially similar manner as the first owner 105 and the second owner 110 may be designated respective types of PCFs to manage.

When the first deliverer 115 and the second deliverer 120 receive a PCF package 200 from an owner, the respective deliverer signature of the first deliverer 115 and the second deliverer 120 may be computed over the PCF package 200 and appended to the PCF package (e.g., in the Deliverer Signature field 230) before transmission of the PCF package 200 to the stations 130, 135, 140. It should be noted that it is described that the deliverer signature may be computed. This means that the signature that is appended to the PCF package may be computed using, for example, a key type encryption algorithm or any other type of algorithm for computing signatures such that the signature is private and only the intended receiver (e.g., the stations 130, 135, 140) may decrypt the signature. Thus, the illustration of a simple electronic signature in the Deliverer Signature field 230 of FIG. 2 is only used as an example in that it is contemplated that the actual signatures will be, but are not required to be, encrypted. The same discussion applies to the owner's signature.

The PCF package 200 may first be generated by the first owner 105 or the second owner 110. If the first owner 105 or the second owner 110 is also configured to distribute the PCF package 200 to the first station 130, the second station 135, and the third station 140, the deliverer signature may be computed using the owner verification key while the owner signature may be omitted. In this scenario, only the deliverer signature may be relied upon to determine the validity of the PCF package 200. As will be described in further detail below, the omission of the owner signature in the Owner Signature field 220 may still enable the stations 130, 135, 140 to verify the PCF package 200. If the first deliverer 115 or the second deliverer 120 is configured to distribute the PCF package 200, the first owner 105 and the second owner 110 may append the owner signature prior to transmitting the PCF package 200 to the deliverer. Subsequently, the deliverer signature that identifies the respective deliverer may be appended. In this scenario, the owner signature and the deliverer signature may be relied upon to determine the validity of the PCF package 200.

When utilizing the first deliverer 115 or the second deliverer 120, the first owner 105 or the second owner 110 may provide the PCF package 200 with the owner signature in the Owner Signature field 220 to the deliverer in a variety of manners. In a first example, the first owner 105 and the second owner 110 may establish a connection to the network 125 (e.g., the Internet) to transmit the PCF package 200 to the first deliverer 115 and the second deliverer 120 that have also established a connection to the network 125. In a second example, the first owner 105 and the second owner 110 may use any data transfer hardware (e.g., flash drive) to provide the PCF package 200 to the deliverers. In a third example, the first owner 105 or the second owner 110 may establish a private connection such as a VPN or peer-to-peer connection with the first deliverer 115 or second deliverer 120.

Once the first deliverer 115 or the second deliverer 120 has received the PCF package 200, the first deliverer 115 or the second deliverer 120 may transmit the PCF package 200 by distributing the data to the first station 130, the second station 135, and the third station 140. For example, the first station 130, the second station 135, and the third station 140 may have established a wireless connection to the network 125 for the transmission of the PCF package 200 to be performed. As will be described in further detail below, the first station 130, the second station 135, and the third station 140 may perform an initial check to determine the validity of the PCF package 200 prior to applying the modification to the PCF.

It should be noted that the owner signature and the deliverer signature may only be appended by the respective entity. That is, the owner may append only its respective owner signature while the deliverer may append only its deliverer signature. This may provide a security mechanism to ensure that only authorized entities are providing the PCF package 200 to the stations 130, 135, 140. Therefore, the deliverer may only include a deliverer signature in the Deliverer Signature field 230 without the capability of altering the owner signature in the Owner Signature field 220. The owner may append its signature as both the owner signature and the deliverer signature depending on the circumstances of distribution of the PCF package 220. Thus, the owner has the capability of altering the Owner Signature field 210 and the Deliverer Signature field 230. This may be accomplished, for example, by providing the authorized owners and deliverers a corresponding level of permission that allows the PCF package 200 to be created/modified based on the level of permission of the entity attempting to create/modify the PCF package 200. For example, the owners (e.g., first owner 105 and second owner 110) may have a first level of permission that allows the owners to modify any field of the PCF package 200. Whereas, the deliverers (e.g., first deliverer 115 and second deliverer 120) may have a second level of permission that only allows the deliverers to modify the Deliverer Signature field 230. Thus, the owners may create and modify the PCF package 200 in any way and the deliverers may only add their signature to the PCF package 200.

It should also be noted that the PCF package 200 for a particular modification of a PCF may be generated by one or both the first owner 105 and the second owner 110. In a similar manner, when utilizing a deliverer, the distribution of the PCF package 200 may be performed by one or both of the first deliverer 115 and the second deliverer 120. In a first example, the first deliverer 115 may receive the PCF package 200 from the first owner 105 and distribute the PCF package 200 to the first station 130, the second station 135, and the third station 135. In a second example, the first deliverer 115 and the second deliverer 120 may receive the PCF package 200 from the first owner 105. The first deliverer 115 may distribute the PCF package 200 to the first station 130 and the second station 135 while the second deliverer 120 may distribute the PCF package 200 to the third station 140. This delivery of the PCF package 200 by different deliverers may be based on any number of factors such as, for example, geographic location, service provider, type of station, etc.

Figure 3:
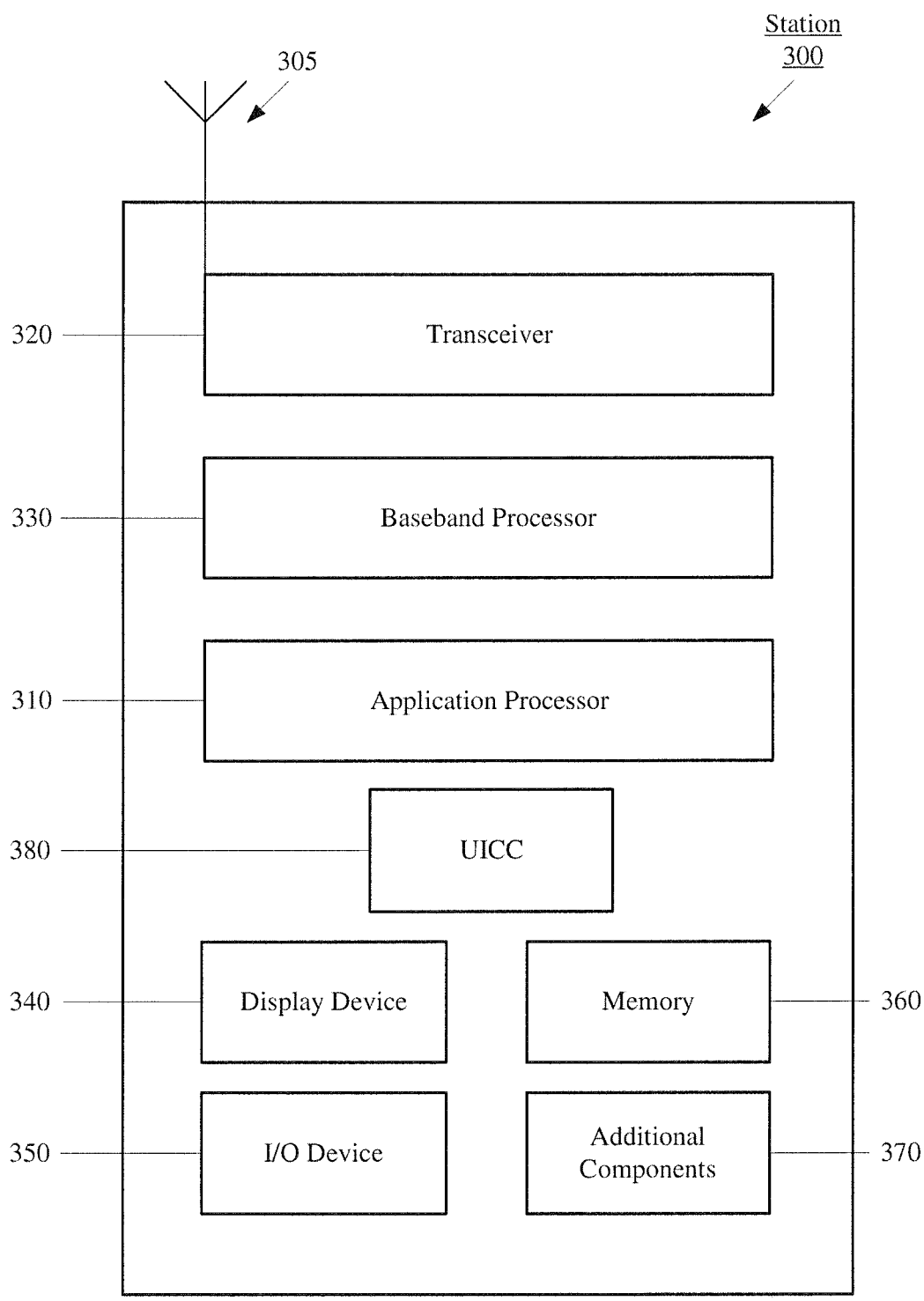
FIG. 3 shows an exemplary station that includes one or more PCFs that may be managed according to exemplary embodiments described herein.

The first station 130, the second station 135, and the third station 140 may represent any electronic device that is configured with PCFs. FIG. 3 shows an exemplary station 300 that includes one or more PCFs that may be managed according to exemplary embodiments described herein. The exemplary station 300 may represent one or more of the stations 130, 135 and 140. For example, the station 300 may be a portable device such as a phone, a smartphone, a tablet, a phablet, a laptop, etc. In another example, the station 300 may be a stationary device such as a desktop terminal. The station 300 may include an antenna 305 connected to a transceiver 320, which is connected to a baseband processor 330, which is further connected to an applications processor 310. The station 300 may further include a display 340, an I/O device 350, a memory arrangement 360 that are accessible by the baseband processor 330 or the applications processor 310. Those skilled in the art will understand that the station 300 may also include additional components 370, for example, a Bluetooth/WiFi transceiver, further input devices (e.g., a keypad, a touchscreen, etc.), a battery, etc. In addition, the station 300 may also include a UICC 380 (e.g., Subscriber Identification Module (SIM) card). The UICC 380 may store the PCFs for the station 300 which are used to enforce rules and behavior on the platform level. The application processor 310 of the station 300 may execute a PCF verification application to determine whether a received PCF package 200 is valid to be applied. The memory 360 may store the PCF database discussed above to be used by the PCF verification application.

As discussed above, the stations 130, 135, 140 may each receive the PCF package 200 from either the first owner 105, the second owner 110, the first deliverer 115, or the second deliverer 120. However, it should be noted that all the stations 130, 135, 140 receiving the PCF package 200 is only exemplary. As discussed above and in a first exemplary embodiment, the stations 130, 135, 140 may each be associated with a common set of PCFs. For example, the stations 130, 135, 140 may each utilize the same operating system. In such a scenario, all the stations 130, 135, 140 may receive the PCF package 200. In a second exemplary embodiment, the stations 130, 135, 140 may be associated with different sets of PCFs such as from utilizing different operating systems. Thus, only the stations 130, 135, 140 to which the PCF package 200 relates receives the PCF package 200.

When the stations 130, 135, 140 receive a PCF package 200, the application processor 310 may execute the PCF verification application to determine whether the PCF package 200 is valid and subsequently apply the PCF modification included in the PCF package 200 to the station. As discussed above, the PCF package 200 may include the owner signature and/or the deliverer signature depending on whether the deliverer was used or not to transmit the PCF package 200 to the stations 130, 135, 140.

When the first owner 105 or the second owner 110 transmits the PCF package 200 directly to the stations 130, 135, 140, the owner computes the deliverer signature and the owner signature may be omitted. Since only the Deliverer Signature field 230 is completed, the PCF verification application may determine that the PCF package 200 was received from the first owner 105 or the second owner 110 since it may be assumed that the Owner Signature field 220 is omitted only when the owner is also the deliverer.

When the first deliverer 115 or the second deliverer 120 transmits the PCF package 200 to the stations 130, 135, 140, the PCF package 200 may include the owner signature and the deliverer signature. With the owner signature already included in the PCF package 200 from receiving the PCF package 200 from the first owner 105 or the second owner 110, the deliverer may include the deliverer signature in the Deliverer Signature field 230 prior to distributing the PCF package 200 to the stations 130, 135, 140. Since the Deliverer Signature field 230 has been altered by the first deliverer 115 or the second deliverer 120 with the respective deliverer signature, the PCF verification application may determine that the PCF package 200 was received from the first deliverer 115 or the second deliverer 120.

The PCF verification application may utilize the PCF database to determine the validity of the PCF package 200. When the PCF package 200 is received from the first owner 105 or the second owner 110, the PCF verification application may initially determine the type of PCF to be modified. For example, the PCF verification application may determine the type by assessing the information included in the body 240 of the PCF package 200 or an indicator included in the header 210. Based upon this type, the PCF verification application may reference the PCF database to determine whether the owner signature is one of the owners that is allowed to provide the modification to the PCF. When the PCF package 200 is received from the first deliverer 115 or the second deliverer 120, the PCF verification application may again determine the type of PCF to be modified. Based upon this type, the PCF verification application may reference the PCF database to determine whether the owner signature is one of the owners that is allowed to provide the modification to the PCF and whether the deliverer signature is one of the deliverers that is allowed to transmit the PCF package 200 for the modification to the PCF. Once verified, the PCF verification application may apply the modification to the PCF. If not verified, the PCF verification application may simply discard the PCF package 200 and/or provide a message to the source of the PCF package 200 of its failure.

It should be noted that the PCF package 200 may include a modification to the PCF database itself. In a substantially similar manner to that discussed above, it is first determined that the owner and/or deliverer of the PCF package 200 including the PCF database modification is valid. Then, the modification to the PCF database may be applied. Subsequent PCF packages 200 that are received may then be referenced to the updated PCF database.

Figure 4:
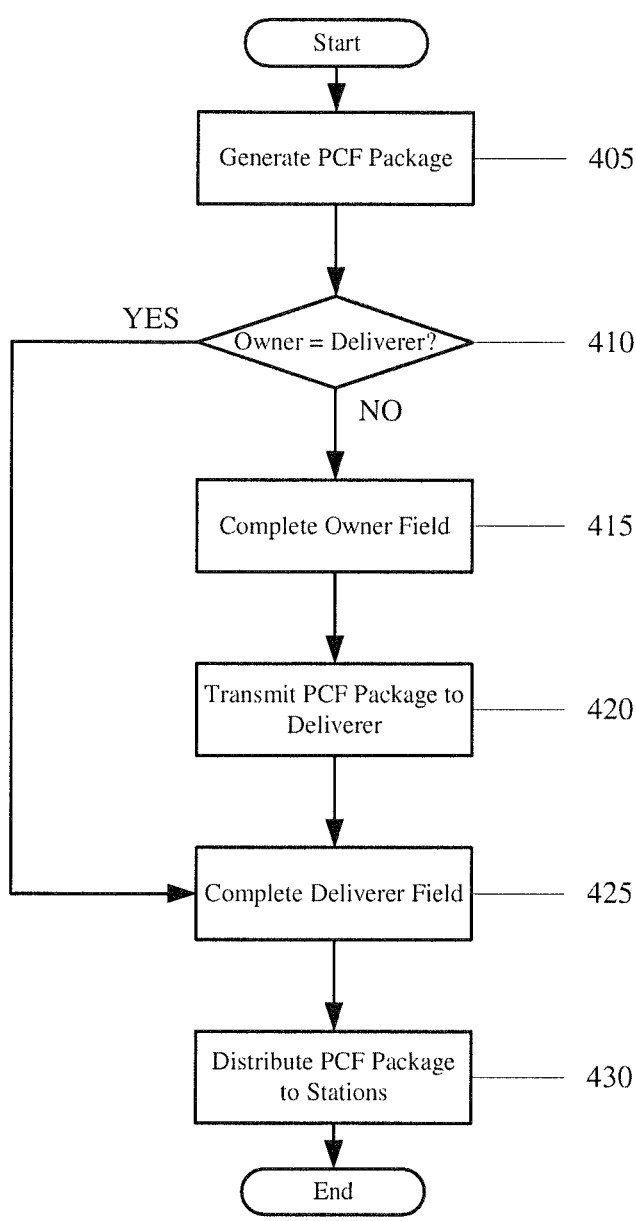
FIG. 4 shows a first exemplary method for generating a PCF package for delivery to stations.

FIG. 4 shows a first exemplary method 400 for generating a PCF package 200 for delivery to the stations 130, 135 and 140. Accordingly, the first exemplary method 400 relates to operations that are performed by an owner and/or a deliverer. The method 400 will be described with reference to the distribution arrangement 100 of FIG. 1 and the PCF package 200 of FIG. 2.

In step 405, the first owner 105 or the second owner 110 generates the PCF package 200 that applies a modification to a PCF. Throughout the remainder of this example, it will be considered that the first owner 105 generates the PCF package 200. As described above, the modification may be an addition of a new PCF, a modification of an existing PCF, or a deletion of an existing PCF. The first owner 105 may generate the PCF package 200 to include the header 210 information, including computing the data to be included in the Owner Signature field 220. In the example of PCF package 200, the data or owner signature is illustrated as "/Owner 1/". The first owner may also generate the PCF modification that is inserted in the body 240 of the PCF package 200.

In step 410, a determination is made whether the owner is the same as the deliverer of the PCF package 200 to the stations 130, 135, 140. As described above, the first owner 105 that generated the PCF package 200 may distribute or deliver the PCF package 200 to the stations 130, 135 and 140 or may delegate this responsibility to separate deliverers (e.g., first deliverer 115 and/or second deliverer 120). If the first owner 105 also distributes the PCF package 200, the method 400 continues to step 425. In step 425, the first owner 105 computes and/or populates the data to be included in the Deliverer Signature field 230. The data or deliverer signature that would be included in the Deliverer Signature field 230, in this example, would be the same "/Owner 1/" signature as in the Owner Signature field 220 because the owner and deliverer are the same (e.g., first owner 105).

As was described above, when the owner is also the deliverer, the Owner Signature field 220 may be omitted because the owner's signature will also appear in the Deliverer Signature field 230 and it is not necessary for the stations 130, 135 and 140 to verify the same signature twice (e.g., as the owner and distributor). Thus, while the first owner 105 may have calculated the owner signature in step 405, this data may not have been populated into the Owner Signature field 220 because as described herein, it may not be necessary to populate the Owner Signature field 220 if the owner and deliverer are the same entity.

Returning to step 410, if the first deliverer 115 or the second deliverer 120 is to distribute the PCF package 200, the method 400 continues to step 415. In step 415, the first owner 105 completes the Owner Signature field 220. In step 420, the first owner 105 transmits the PCF package 200 with the owner signature in the Owner Signature field 220 to the first deliverer 115 or the second deliverer 120. In this example, it will be considered that the second deliverer 120 is the selected deliver for the PCF package 200. Thus, in step 420, the first owner 105 transmits the PCF package 200 to the second deliverer 120.

In step 425, the second deliverer 120 calculates the deliverer signature (e.g., "/Deliverer 2/"). The second deliverer may then populate this deliverer signature into the Deliverer Signature field 230 of the PCF package 200. Subsequently to the step 425 (whether entered from step 410 or step 420), the method 400 continues to step 430 where the PCF package 200 is distributed to the stations 130, 135, 140 from the first owner 105 or the second deliverer 120. Accordingly, if the PCF package 200 is delivered from the first owner 105, the PCF package 200 may include only the owner signature in the Deliverer Signature field 230. However, if the second deliverer 120 delivers the PCF package 200, the PCF package 200 will include the owner signature of the first owner 105 in the Owner Signature field 220 and the deliverer signature of the second deliverer 120 in the Deliverer Signature field 230.

Figure 5:
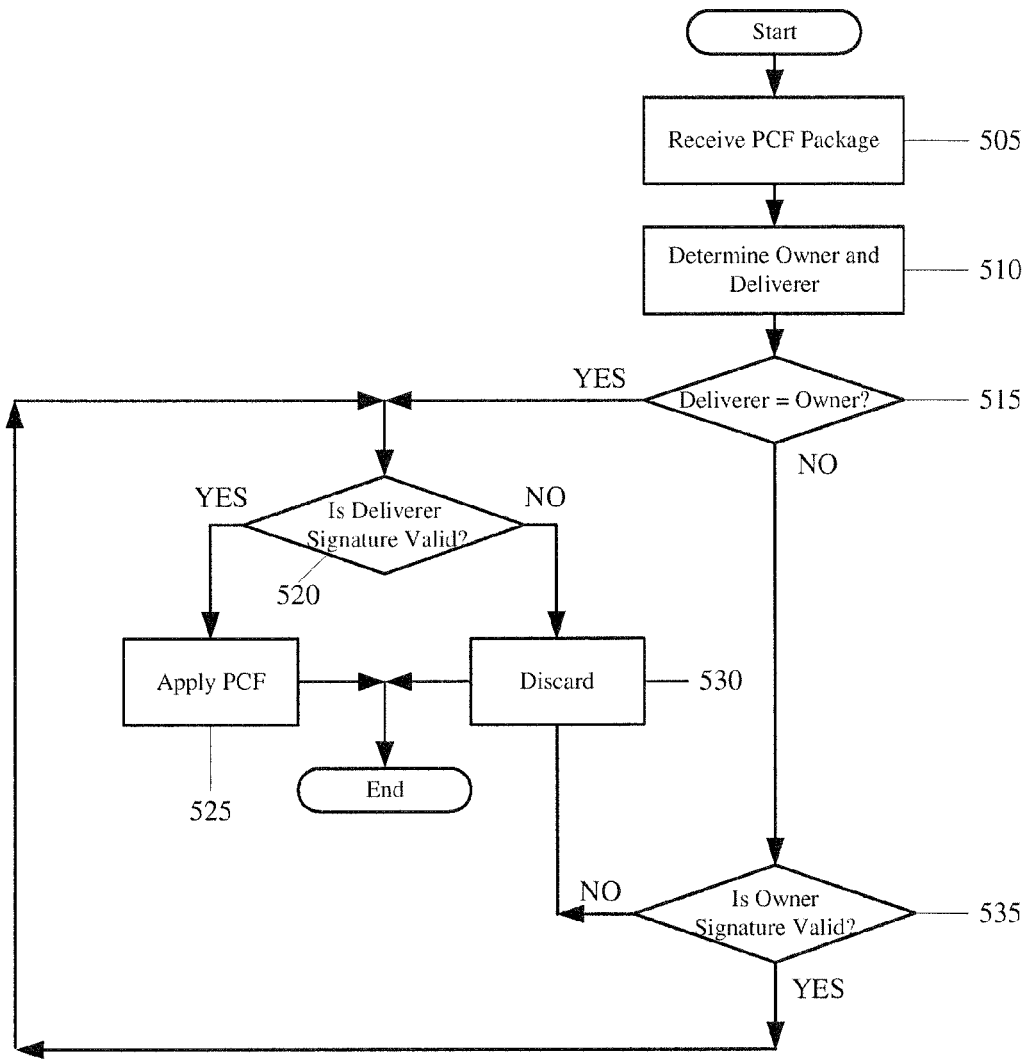
FIG. 5 shows a second exemplary method for determining a validity of a PCF package received by a station.

FIG. 5 shows a second exemplary method 500 for determining a validity of a PCF package 200 received by a station. Accordingly, the second exemplary method 500 relates to a station side operation. The method 500 will be described with reference to the distribution arrangement 100 of FIG. 1, the PCF package 200 of FIG. 2 and the station 300 of FIG. 3. It may also be considered that the method 500 is an exemplary method that is performed by the PCF verification application that was described above.

In step 505, the stations 130, 135, 140 receive the PCF package 200 from either the owner or the deliverer. Throughout the remainder of this description of method 500, it will be considered that the first station 130 received the PCF package 200 and that the first station 130 is of the type of the station 300 of FIG. 3 (e.g., includes the same components as). As described above, the station 300 may store the PCFs that it uses in the UICC 380 and may further store the PCF database in the memory 360. It was also described above that the application processor 310 of the station 300 executed the PCF verification application. It should be noted that the components described to perform each of these functions (i.e., the storing of the PCS, PCF database and executing the PCF verification application) is only exemplary and other components within the station 300 may also perform some or all of these functionalities.

In step 510, the PCF verification application determines the owner and the deliverer of the PCF package 200. This may be determined by decrypting the owner signature and the deliverer signature that are included in the Owner Signature field 220 and the Deliverer Signature field 230, respectively. As described above, it is contemplated, but not required, that the received signatures are encrypted using any known manner of encrypting information (e.g., key encryption). The station 300 may have a key stored in memory 360 that allows the station 300 to decrypt the encrypted signatures. On the other hand, if the signatures are not encrypted, this determination may be simply performed by reading the signatures in the corresponding fields 220 and 230.

In step 515, the PCF verification application determines whether the deliverer is the same as the owner. For example, if the Owner Signature field 220 is empty, the deliverer is the same as the owner. If the deliverer is the same as the owner (i.e., the owner transmits the PCF package 200), the method 500 continues to step 520. In step 520, the PCF verification application determines whether the signature in the Deliverer Signature field 230 (i.e., the owner signature as the owner is also the deliverer) is valid. As discussed above, the PCF verification application may initially determine the type of PCF to be modified and reference the PCF database to determine the validity of the owner signature in the Deliverer Signature field 230.

Figure 6:
FIG. 6 shows an exemplary embodiment of a PCF database that may be used to verify a PCF package.

FIG. 6 shows an exemplary embodiment of a PCF database 600 that may be used to verify the PCF package 200. The exemplary PCF database 600 includes three columns, a PCF Type column 610, a Valid Owner column 620 and a Valid Deliverer column 630. In this example, there are three defined types of PCFs, Type A, Type B and Type C. The Type A PCF has a valid owner of first owner 105 and valid deliverers of first deliverer 115 and second deliverer 120. Thus, in this example a Type A PCF may be validly modified by first owner 105 and may be validly delivered by first owner 105, first deliver 115 and second deliverer 120 (e.g., because the valid owner may also be a valid deliverer). Similar examples are also provided for the Type B and Type C PCFs in the PCF database 600. As was described above, the PCF database 600 may be stored in the memory 360 of the station 300 for use by the PCF verification application.

Referring back to the step 520 of the method 500, the following example may be considered. The PCF verification application has determined that the PCF package 200 includes a Type B PCF. The PCF verification application has also determined that the owner's signature in the Deliverer Signature field 230 of the PCF package 200 is the signature of the second owner 110. The PCF verification application may refer to the PCF database 600 and determine that second owner 110 is a valid owner of a Type B PCF and therefore a valid deliverer of the PCF package 200.

If the signature is valid, the method 500 continues to step 525 in which the modification to the PCF is applied. In the example started above, the PCF package 200 was determined to be valid based on the information contained in the PCF package 200 and the information in the PCF database 600. Thus, the PCF verification application will apply the modification to the corresponding PCF. As described above, the modification may be a change to the PCF, the adding of a new PCF or the deletion of an existing PCF. In this example, since the PCF package 200 was determined to be valid, the PCF verification application will apply the modification to the PCFs that are store din the UICC 380 of the station 300.

However, a different example may also be considered. In this example, the PCF verification application has determined that the PCF package 200 includes a Type B PCF. The PCF verification application has also determined that the owner's signature in the Deliverer Signature field 230 of the PCF package 200 is the signature of the first owner 105. The PCF verification application may refer to the PCF database 600 and determine that first owner 105 is not a valid owner of a Type B PCF and therefore not a valid deliverer of the PCF package 200. In this case, the method 500 will proceed from step 520 to step 530 where the PCF package 200 is discarded. Since the PCF package 200 was not received from a valid deliverer, the station 300 will not apply the PCF modification included in the PCF package 200. As described above, the station 300 may also inform the deliverer (e.g., first owner 105) or some other entity that the PCF package 200 was discarded because the deliverer was not valid.

Returning to step 515, if the deliverer is not the owner (e.g., the Owner Signature field 220 has been populated with an owner signature and not left blank), the method 500 continues to step 535. In step 535, the PCF verification application first determines whether the owner's signature in the Owner Signature field 220 of the PCF package 200 is valid in a substantially similar manner discussed above with step 520. For example, the PCF verification application determines whether the owner's signature is the signature of a valid owner for the type of PCF in the PCF package 200 using the PCF database 600.

If the owner's signature is not valid, the method 500 continues to step 530 for the PCF package 200 to be discarded. If the owner's signature is valid, the method 500 continues to step 520 where a further check is performed for the signature in the Deliverer Signature field 230. Thus, in this example, both the Owner Signature field 220 and the Deliverer Signature field 230 include signatures. The step 535 verifies the owner signature and the step 520 verifies the deliverer signature.

To provide a specific example of this process, it may considered that the PCF verification application has determined that the PCF package 200 includes a Type A PCF. The PCF verification application has also determined that the owner's signature in the Owner Signature field 220 is the signature of the first owner 105 and the deliverer's signature in the Deliverer Signature field 230 is the signature of the first deliverer 115. Thus, in step 535, the PCF verification application will determine that the signature of the first owner 105 is a valid owner's signature for a Type A PCF and in step 520 the PCF verification application will determine that the signature of the first deliverer 115 is a valid deliverer's signature for a Type A PCF. Therefore, the PCF verification application will apply the PCF modification included in the PCF package 200 to the station 300 in step 525. To the contrary, if either the owner's signature or the deliverer's signature is not valid, the station 300 will discard the PCF package 200.

The exemplary embodiments provide a system and method for PCF management mechanisms by providing updates to PCFs to deployed stations. Due to the security level of PCFs, the stations first determine the validity of a received PCF package prior to applying the modification to the PCF. When the owner of the PCF generates the PCF package, includes the owner signature, and distributes the PCF package to the station, the station may determine the validity of the PCF package by referencing a PCF database that indicates whether the owner signature is valid. When the owner of the PCF generates the PCF package, includes the owner signature in an owner field, and transmits the PCF package to a deliverer with the deliverer including the deliverer signature in a deliverer field and distributing the PCF package to the station, the station may determine the validity of the PCF package by reference the PCF database that indicates whether the owner signature and the deliverer signature is valid.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Mac platform, MAC OS, iOS, Android OS, etc. In a further example, the exemplary embodiments of the above described method may be embodied as a program containing lines of code stored on a non-transitory computer readable storage medium that, when compiled, may be executed on a processor or microprocessor.

It will be apparent to those skilled in the art that various modifications may be made in the present invention, without departing from the spirit or the scope of the invention. Thus, it is intended that the present invention cover modifications and variations of this invention provided they come within the scope of the appended claims and their equivalent.

What is claimed is:

1. A method, comprising:
   at a network component associated with a first entity:
   generating a policy control function (PCF) package including a modification to a PCF associated with a platform level of a station;
   determining whether the PCF package is to be transmitted to the station by one of the first entity and a second entity;
   when the PCF package is determined to be transmitted by the first entity, including a first signature indicative of the first entity in a deliverer field of the PCF package; and
   when the PCF package is determined to be transmitted by the second entity, including the first signature in an owner field of the PCF package.

2. The method of claim 1, further comprising:
   when the PCF package is determined to be transmitted by the first entity, transmitting the PCF package to the station.

3. The method of claim 1, wherein the first entity is permitted to modify the PCF and transmit the PCF package to one of the second entity and the station.

4. The method of claim 1, further comprising:
   when the PCF package is determined to be transmitted by the second entity, transmitting the PCF package to the second entity.

5. The method of claim 4, further comprising:
   at a second network component of the second entity:
   receiving the PCF package;
   including a second signature indicative of the second entity in a deliverer field of the PCF package; and
   transmitting the PCF package to the station.

6. The method of claim 5, wherein the first signature is one of at least one valid first signature and the second signature is one of at least one valid second signature for the modification to the PCF to be applied on the station.

7. The method of claim 5, wherein the second entity is permitted to transmit the PCF package to the station.

8. A method, comprising:
at a station:
- receiving a policy control function (PCF) package from one of a first entity and a second entity, the PCF package including a modification to a PCF associated with the station;
- determining whether the PCF package is valid based on one of a first signature of the first entity in the PCF package or a second signature of the second entity in the PCF package;
- applying the modification to the PCF when it is determined the PCF package is valid; and
- discarding the PCF package when it is determined the PCF package is invalid.

9. The method of claim 8, wherein the first entity is an owner of the PCF, wherein the owner of a PCF is permitted to modify the PCF and transmit the PCF package to the station, and the second entity is a deliverer of the PCF, wherein the deliverer of the PCF is permitted to transmit the PCF package to the station.

10. The method of claim 8, wherein determining whether the PCF package is valid further comprises:
- determining whether the first signature in a deliverer signature field of the PCF package is a valid owner signature.

11. The method of claim 10, wherein the determining whether the first signature is a valid owner signature includes:
- comparing the first signature to a database of valid owner signatures for the PCF to be modified.

12. The method of claim 8, wherein determining whether the PCF package is valid further comprises:
- determining whether the second signature in a deliverer signature field of the PCF package is a valid deliverer signature.

13. The method of claim 8, wherein determining whether the PCF package is valid further comprises:
- determining whether the first signature in an owner signature field of the PCF package is a valid owner signature.

14. The method of claim 8, further comprising:
determining a type of the PCF.

15. The method of claim 8, further comprising:
sending a message to one of the first entity and the second entity when it is determined the PCF package is invalid.

16. A station, comprising:
a processor; and
a non-transitory computer readable storage medium including a set of instructions executable by the processor, wherein executing the set of instructions causes the processor to perform operations, comprising:
- receiving a policy control function (PCF) package from one of a first entity and a second entity, the PCF package including a modification to a PCF associated with the station, the first entity permitted to modify the PCF and one of transmit the PCF package to the second entity and transmit the PCF package to the station, the second entity permitted to transmit the PCF package to the station;
- determining whether one of (1) a deliverer field of the PCF package includes a first signature indicative of the first entity or (2) an owner field of the PCF package includes the first signature and the deliverer field includes a second signature indicative of the second entity; and
- applying the modificaton to the PCF when one of (1) the PCF package is received from the first entity and the first signature in the deliverer field is one of at least one valid first signature or (2) the PCF package is received from the second entity, the first signature in the owner field is one of the at least one valid first signature, and the second signature in the deliverer field is one of at least one valid second signature.

17. The station of claim 16, further comprising:
a Universal Integrated Circuit Card (UICC) that stores the PCF, wherein the modification to the PCF is applied to the PCF stored on the UICC.

18. The station of claim 16, further comprising:
a memory storing a PCF database, the PCF database including a list of valid owners for each PCF stored on the station and a list of valid deliverers for each PCF stored on the station.

19. The station of claim 16, wherein the operations further comprise:
- discarding the PCF package when neither (1) the PCF package is received from the first entity and the first signature in the deliverer field is one of at least one valid first signature or (2) the PCF package is received from the second entity, the first signature in the owner field is one of the at least one valid first signature, and the second signature in the deliverer field is one of at least one valid second signature.

* * * * *